United States Patent [19]
Palmer

[11] Patent Number: 5,881,609
[45] Date of Patent: Mar. 16, 1999

[54] REVERSING-INPUT BIDIRECTIONAL-OUTPUT LONGITUDINALLY-SLIDEABLE-SHAFT

[76] Inventor: Leon Robert Palmer, 81 Pennsylvania Ave., Somerset, Mass. 02726

[21] Appl. No.: 732,999

[22] Filed: Oct. 16, 1996

[51] Int. Cl.[6] ..................................................... B25B 17/00
[52] U.S. Cl. .............................. 74/810.1; 81/57; 81/58.3; 81/58.4; 192/43
[58] Field of Search .............................. 74/810.1; 192/21, 192/43, 48.92; 475/12, 336; 81/57, 57.3, 57.42, 58, 58.3, 58.4

[56] References Cited

U.S. PATENT DOCUMENTS

| | | | |
|---|---|---|---|
| 832,077 | 10/1906 | Pearce | 74/810.1 |
| 1,421,992 | 7/1922 | Linden | 192/43 |
| 1,704,062 | 3/1929 | Starkey | 81/58.4 |
| 2,292,228 | 8/1942 | Krieger | 81/58.3 |
| 2,570,706 | 10/1951 | Peluse | 81/57 |
| 2,916,117 | 12/1959 | Ondeck | 192/21 |
| 3,946,844 | 3/1976 | Johnson | 192/21 |
| 4,341,292 | 7/1982 | Acevedo | 192/43 |
| 4,485,699 | 12/1984 | Fuller | 192/48.92 |
| 5,136,888 | 8/1992 | Nix | 74/810.1 |
| 5,662,009 | 9/1997 | Palmer | 74/810.1 |

*Primary Examiner*—Rodney H. Bonck
*Assistant Examiner*—Sherry Lynn Estremsky

[57] ABSTRACT

A reversing-input bidirectional-output drive mechanism having a single one-piece drive-shaft serving as the input and the output and mounted by a first pair of cylindrical one-way roller-clutches arranged in-line and caused to alternately clutch only the pair of bosses of drive-shaft to drive the entire drive-shaft in clockwise rotation and a second pair of cylindrical one-way roller-clutches arranged in-line and caused to alternately clutch only the same pair of bosses of drive-shaft to drive the entire drive-shaft in counter-clockwise rotation with the one-piece drive-shaft being caused to shift by sliding longitudinally from one pair of roller-clutches to the other pair with a set of four meshing mitre gears being provided with one mitre-gear rotatably mounted to drive-shaft and coupled to an oppositely disposed pair of roller-clutches and a second mitre-gear rotatably mounted to drive shaft and coupled to its own oppositely disposed pair of roller-clutches and two ring mitre-gears facing opposite each other on their own shafts mounted at right angles to drive shaft with all gears being caused to move with oscillatory motion to cause either pair of roller-clutches to clutch the pair of bosses to drive the shaft either clockwise or counter-clockwise.

5 Claims, 14 Drawing Sheets

REVERSING-INPUT BIDIRECTIONAL-OUTPUT LONGITUDINALLY-SLIDEABLE-SHAFT

FIELD OF THE INVENTION

This invention relates to mechanical drive mechanisms and more particularly to those from which the output rotation may be clockwise regardless of the direction of the input rotation and the output rotation may be counter clockwise regardless of the direction of the input rotation.

BACKGROUND OF THE INVENTION

In comparison, ratchet mechanism only has the capability of driving in one direction of rotation while in the opposite direction of rotation the spring-loaded pawl unproductively overrides the teeth of the ratchet while "ratcheting-up" thereby wasting motion. The applicant's mechanism provides the capablitity of driving in one direction while applying both clockwise and counter clockwise rotation alternatingly to the input and thereby out performing the ratchet mechanism with double output.

A ratchet mechanism is notorious for its infamous "clicking" noise caused by the spring-loaded pawl repeatedly impacting the teeth of the ratchet during the ratcheting-up. Because the applicant's mechanism is comprised of a plurality of one-way roller clutches, a silent operation is achieved.

In space-limited situations the handle of a ratchet-type wrench is not always capable of being moved enough to advance the pawl to the next tooth on the ratchet and thereby renders the ratchet as useless. Because the applicant's mechanism is comprised of one-way roller clutches even infinitesimal movements of the tool handle in either direction are productive.

The above mentioned advantages enables the applicant's drive mechanism to supercede the ratchet mechanism.

SUMMARY

The applicant's reversing-input bidirectional-output drive-mechanism invention is exemplified in a screw/socket/hex/nut driver embodiment in which the advantages of the mechanism are better explained and appreciated.

The uniqueness, convenience and simplicity of this mechanism is its ability to perform its functions with a minimum number of components. Its function is providing the capability of producing clockwise output from an oscillatory input-motion and counter-clockwise output from an oscillatory input-motion which is achieved by shifting the single drive-shaft, which is the input as well as the output, by sliding it longitudinally a short distance from a first pair of roller-clutches disposed to cause clockwise output to a second pair of roller-clutches disposed to cause counter-clockwise output then holding the gear-box stationary with one hand while applying oscillatory input-motion with the other hand. Because all the components are arranged to an in-line configuration the mechanism is sleek in appearance, easy to handle and easily adapted to numerous applications.

The mechanism is applicable to, provides twice the efficiency of and improves the ergonomics of numerous devices conventionally operated by rotating a screw by turning a handwheel such as bench-vises, c-clamps, machine-vises, micrometers, tubing-cutters, window-cranks for residential and commercial crank-out windows and venetian-blind turning-mechanism.

The mechanism is also applicable to, provides twice the efficiency of and supersedes the ratcheting-mechanism conventionally used in such devices as ratchet screw drivers and ratchet wrenches. Because the applicant's invention uses roller-clutches and thereby is virtually soundless in operation and operates in extremely space-limited situations even with ultra-small oscillatory-motions applied to the input whereby a ratcheting-mechanism is noisy with its infamous "clicking" sound caused by the spring-loaded pawls repeatedly impacting the ratchet teeth during override. A ratcheting-mechanism is not always able to advance to the next ratchet tooth in extremely space-limited situations. A ratchet-mechanism is limited to only clockwise input to produce clockwise output and is limited to only counter-clockwise input to produce counter-clockwise output.

BRIEF DESCRIPTION OF THE DRAWINGS

FIG. 15 is a layout of components of the anti rotation attachment with identifying reference numerals.

DESCRIPTION OF THE PREFERRED EMBODIMENT

Figure 1:
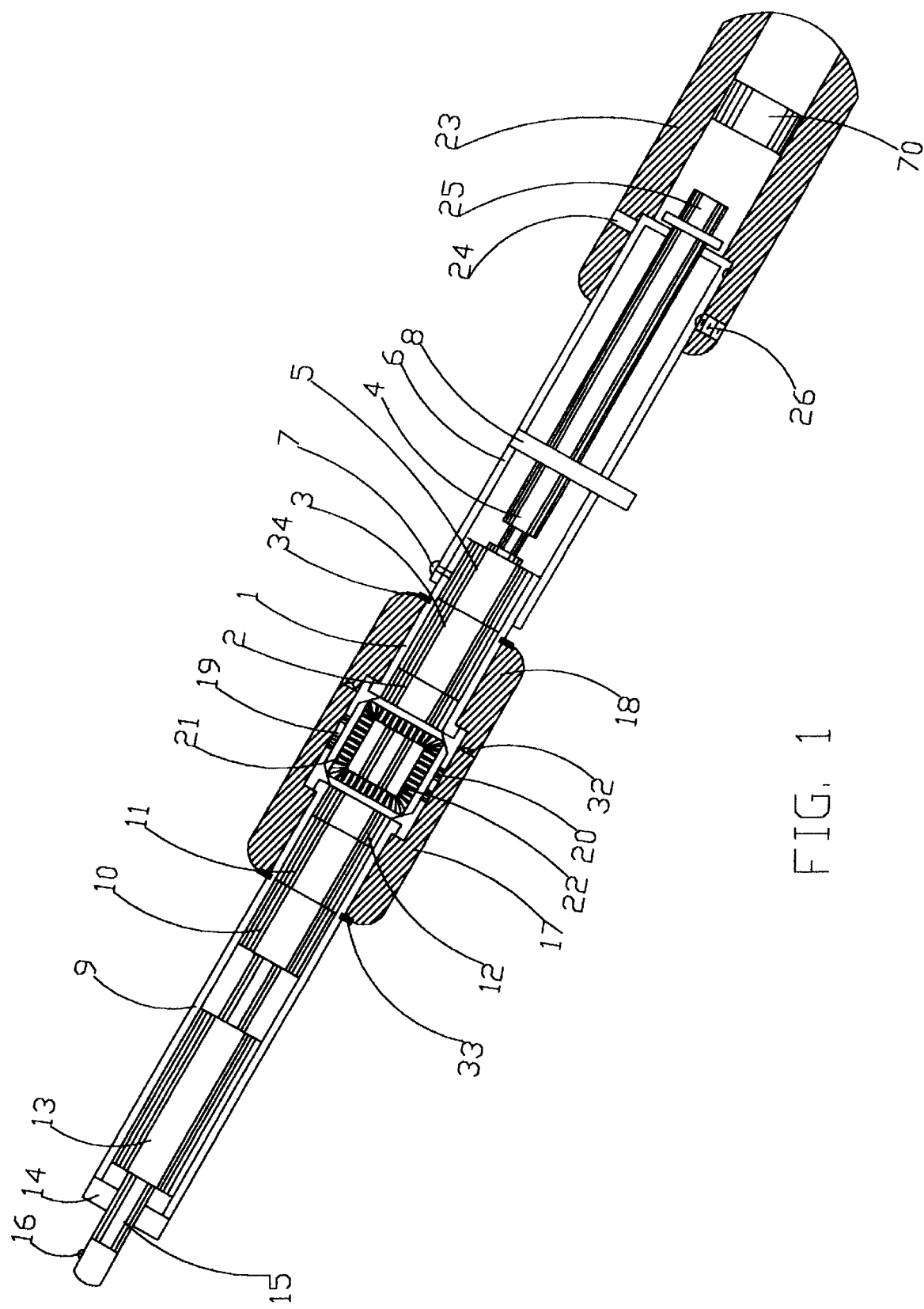
FIG. 1 is a layout of all the components with their identifying reference numerals.

In FIG. 1 flanged-end of hollow cylinder 1 has the hub of mitre-gear 2 pressed into its bore. Cylindrical one-way roller-clutch 3 disposed so as to clutch and drive shaft 4 only in clockwise rotation is pressed into unflanged-end of cylinder 1 and against hub of mitre-gear 2. Cylindrical one-way roller-clutch 5 disposed so as to clutch and drive shaft 4 only in counter-clockwise rotation is pressed into bore of unflanged-end of cylinder 1 and against roller-clutch 3 with components 1,2,3 and 5 being referred to hereafter as cylinder 1 assembly.

Open-end of cylinder 6 is slid onto and secured in place to flangeless-end of cylinder 1 with fastener 7. At approximately its middle, cylinder 6 is provided with a through-hole at its diameter into which cylindrical shaft-lock 8 is inserted and retained. Shaft-lock is provided with a key-hole shaped opening at its middle whereby the larger circular opening of keyhole-shape allows the largest diameter of shaft 4 to pass through longitudinally while shifting from one pair of roller-clutches to the other pair for switching to either clockwise or counterclockwise output. The smaller diameter slot of keyhole shape of shaft-lock 8 becomes inserted below the surface of largest diameter of shaft 4 and into channels provided to prevent shaft from movinglongitudinally and thereby locking shaft 4 in place. Cylindrical post 24 is pressed into opening provided at closed-end of cylinder 6 and whose function is defined later.

Flanged-end hollow cylinder 9 has a larger diameter bore at each end and a smaller centralized bore. One-way roller-clutch 10 is pressed into bore of flanged-end of cylinder 9 and disposed so as to clutch and drive shaft 4 only in clockwise rotation. One-way roller-clutch 11 is also pressed into bore of flanged-end of cylinder 9 but disposed so as to clutch and drive shaft 4 only in counter-clockwise rotation. The hub of mitre-gear 12 is pressed completely into bore of flanged-end of cylinder 9.

Hollow cylindrical driven-member 13 has a through-bore which can be square, hex and octagonal shape for accepting standard shaped drivers and is rotatably inserted into unflanged-end of cylinder 9.

Cap 14, provided with a centralized bore through which driving-member 15, containing spring-loaded ball-plunger 16, passes to receive standard attachments is also provided with external threads for mating with internal threads at the entrance of flangeless-end of cylinder 9. Once screwed into cylinder 9, cap 14 retains driven-member 13 rotatably in place at its anterior end while smaller centralized bore retains driven-member 13 rotatably in place at its posterior-end.

Gear housing consists of an open-ended container-like front-section 17 and an open-ended container-like back-section 18. Length of front-section 17 extends beyond posts 19 and 20 which are pressed into openings provided for the mounting of mitre ring-gears 21 and 22 perpendicular to and meshing simultaneously with mitre-gears 2 and 12. Frontend of front-section 17 has an opening provided for the insertion of flanged-end cylinder 9 with its flange on the inside of container.

Back end of back-section 18 has an opening provided for the insertion of flanged-end cylinder 1 assembly with its flange on the inside of container. A plurality of rounded-tip dowels 32 are pressed into bores provided in rim of open-end of front-section 17 for aligning with and mating with a snug slip-fit condition with a plurality of bores in the rim of open-end of back-section 18. Retaining-ring 33 is installed into groove provided in cylinder 9 at the outside surface of front-section 17 to retain cylinder 9 assembly rotatably in place. Retaining-ring 34 is installed into groove provided in cylinder 1 at the outside surface of back-section 18 to retain cylinder 1 assembly rotatably in place. Ball-plunger 26 installed into side wall of handle 23 locates and locks into detents provided in side wall of cylinder 6 for aligning channels 30 and 31 with shaft-lock 8.

Figure 2:
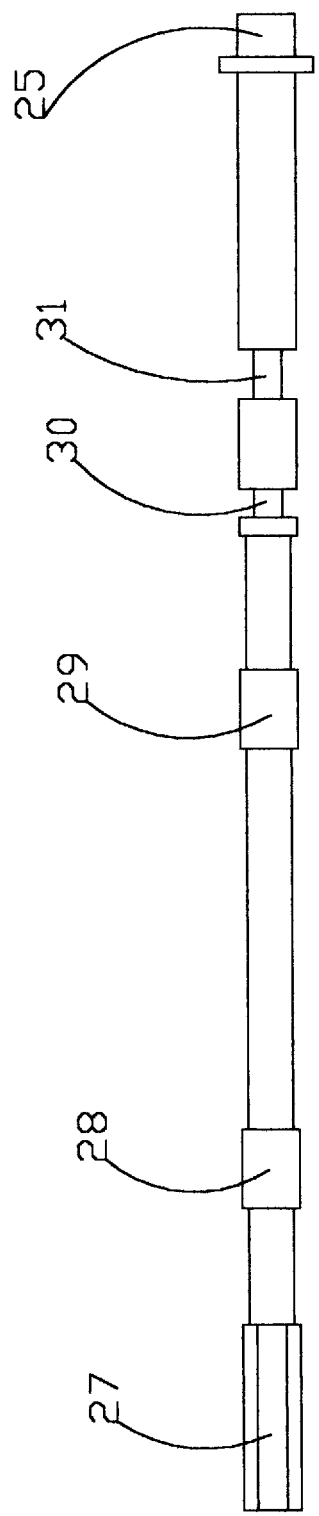
FIG. 2 shows the details of drive-shaft 4 with identifying reference numerals.

In FIG. 2 one-piece drive-shaft 4 consists of a hexagonal section 27 which is permanently and slidably engaged with driven-member 13 to drive it in clockwise and counter-clockwise rotation. Bosses 28 and 29, initially clutched and driven in clockwise rotation alternately by roller-clutches 10 and 1, are caused to slide out of engagement from roller-clutches 1 and 10 and into engagement with roller-clutches 5 and 11 in order to be clutched and driven in counter-clockwise rotation. Channels 30 and 31 are locking features for shaft-lock 8 to slide into to prevent shaft 4 from sliding longitudinally while bosses 28 and 29 are engaged with either the pair of roller-clutches which cause clockwise rotation or the pair of roller-clutches which cause counter-clockwise rotation.

Figure 3:
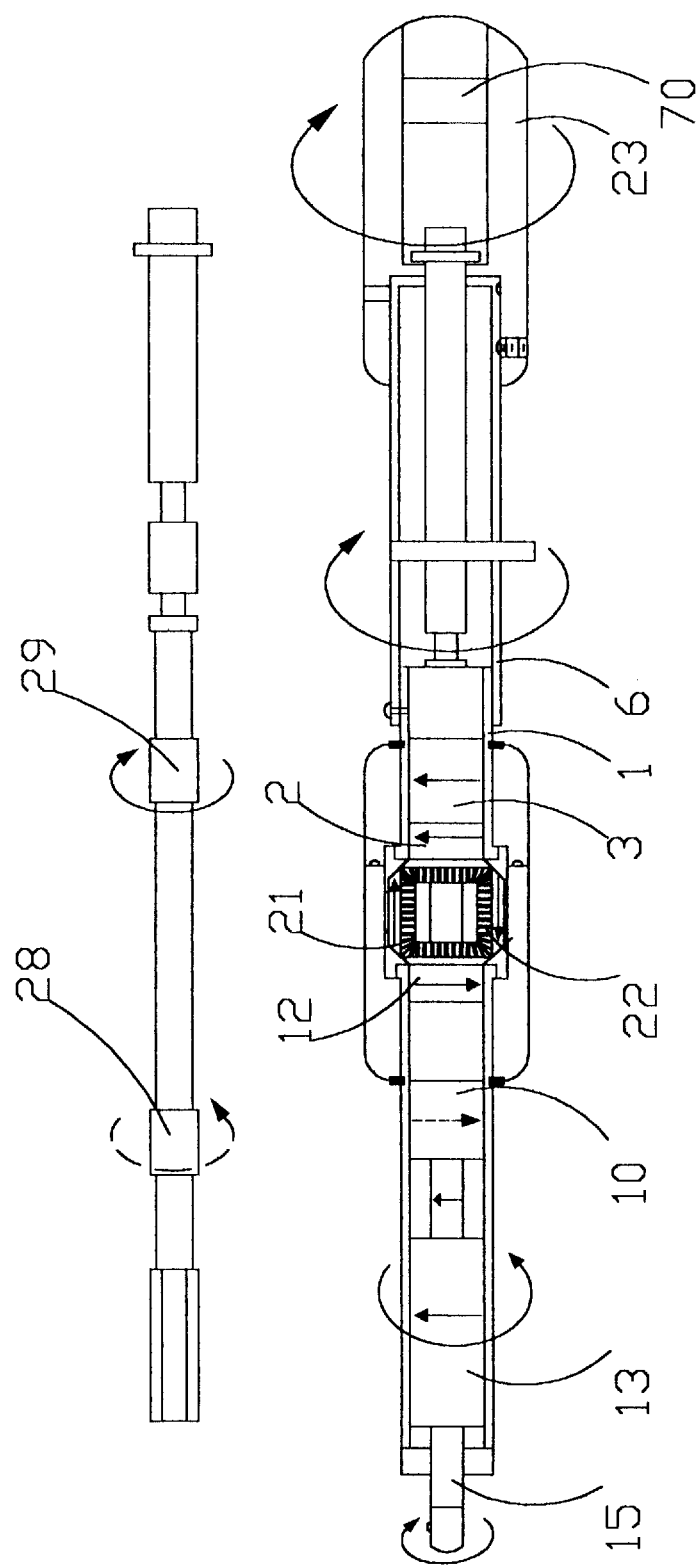
FIG. 3 is a direction-of-rotation-analysis of the components with clockwise rotation applied to the input and producing clock-wise output. The device is shown with shaft 4 switched to the position for causing clockwise output.

Thus, to produce clockwise rotational output from an oscillatory input-motion refer to FIG. 3 and the following direction-of-rotation-analysis of components:

Clockwise rotation is applied to handle 23;
Cylinder 6 is caused to rotate clockwise;
Cylinder 1 assembly is caused to rotate clockwise;
Roller-clutch 3 clutches and drives boss 29 clockwise to cause entire shaft 4 to rotate clockwise;
Mitre-gear 2 is caused to rotate clockwise;
Mitre ring-gears 21 and 22 are caused to rotate clockwise;
Mitre-gear 12 is caused to rotate counter-clockwise;
Cylinder 9 assembly is caused to rotate counter-clockwise;
Roller-clutch 10 is caused to rotate counter-clockwise to override boss 28;
Driven-member 13 is caused to rotate clockwise;
Driving-member 15 is caused to rotate clockwise.

Figure 4:
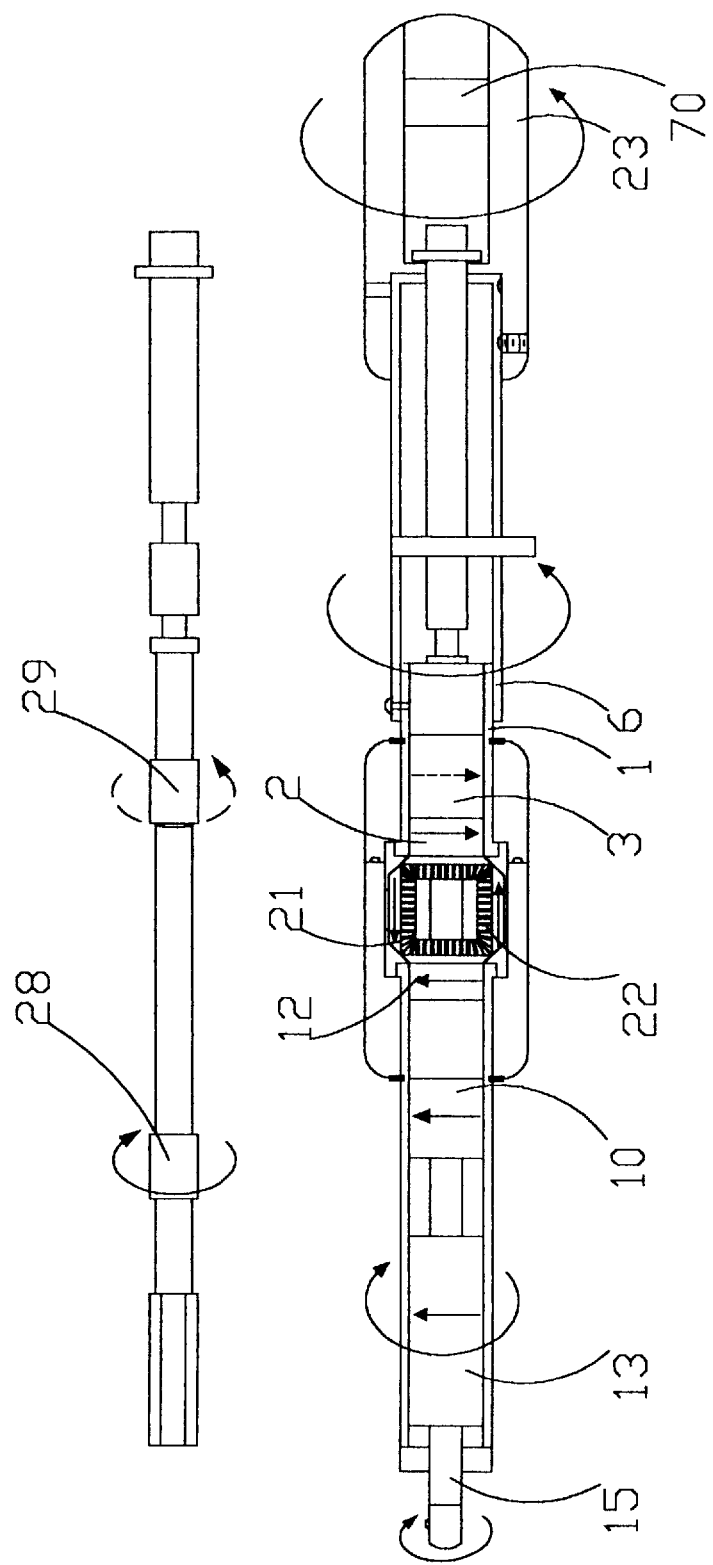
FIG. 4 is a direction-of-rotation-analysis of the components with counter-clockwise rotation applied to the input while still producing clockwise output. The device is shown with shaft 4 switched to the position for causing clockwise output.

Refer to FIG. 4 and the following direction-of-rotation-analysis of components:

Counter-clockwise rotation is now applied to handle 23;
Cylinder 6 is caused to rotate counter-clockwise;
Cylinder 1 assembly is caused to rotate counter-clockwise;
Roller-clutch 3 is caused to rotate counter-clockwise to override boss 29;
Mitre-gear 2 is caused to rotate counter-clockwise;
Mitre-ring gears 21 and 22 are caused to rotate counter-clockwise thereby converting counter-clockwise input rotation to usable clockwise rotational output.
Mitre-gear 12 is caused to rotate clockwise;
Cylinder 9 assembly is caused to rotate clockwise;
Roller-clutch 10 is caused to rotate clockwise to clutch and drive boss 28 clockwise to cause entire shaft 4 to rotate clockwise;
Driven-member 13 is caused to rotate clockwise;
Driving-member 15 is caused to rotate clockwise.

To change the rotational output mode of the device from clockwise output to counter-clockwise output, drive-shaft 4 must be unlocked, slid longitudinally out of engagement from roller-clutches 1 and 10 and into engagement with roller-clutches 5 and 11 then relocked into position.

Figure 5:
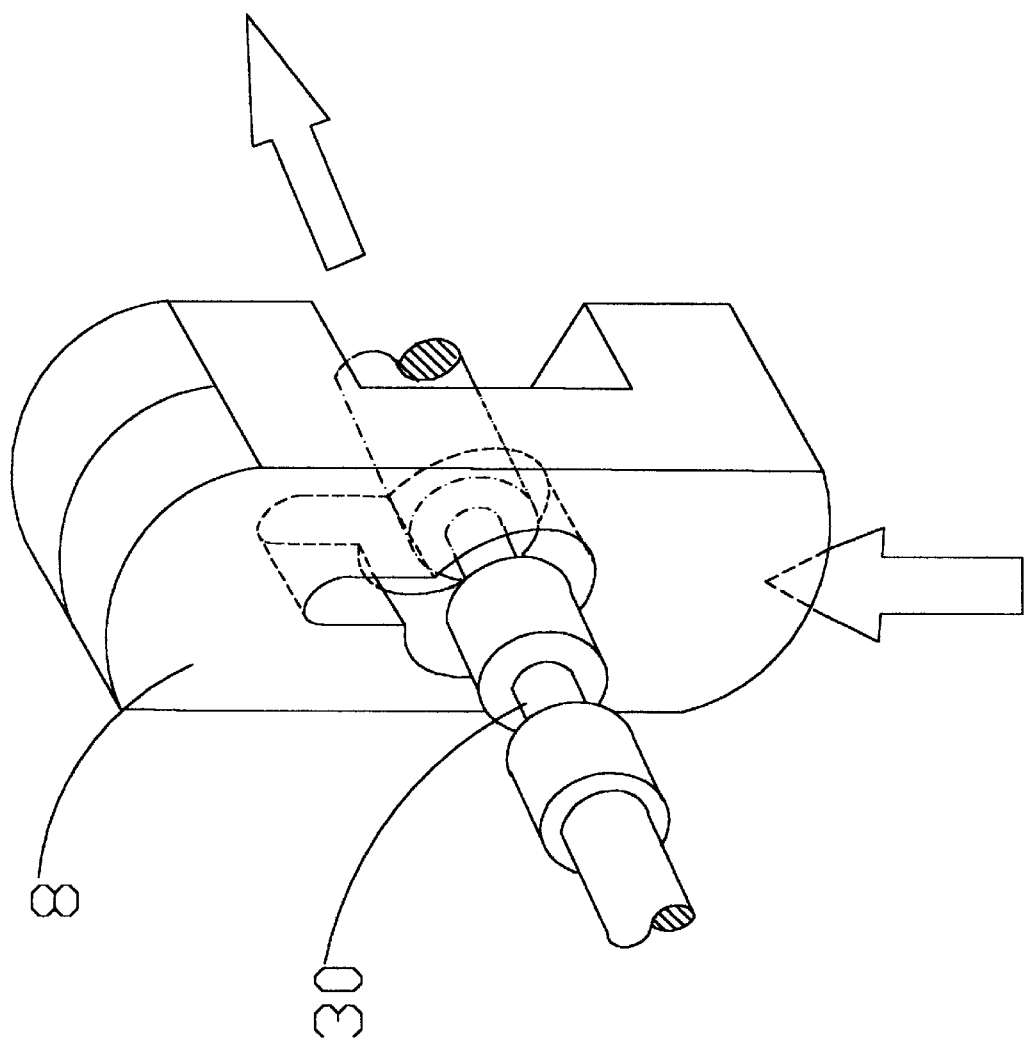
FIG. 5 shows shaft-lock 8 lifted out of channel 31 to allow shaft 4 to longitudinally pass through larger diameter opening of key-shaped opening.

To enable shaft 4 to slide longitudinally, shaft-lock 8 of FIG. 5 must be lifted flush with surface of cylinder 6 in order for larger diameter opening of key-shape-opening to physically permit the largest diameter of shaft 4 to pass through until channel 31 in shaft 4 is aligned with shaft-lock 8. The alignment of shaft-lock 8 with channels 30 and 31 is detected by ball-plunger 26,of FIG. 1, locking into either of two detents provided in outside surface of cylinder 6.

Figure 6:
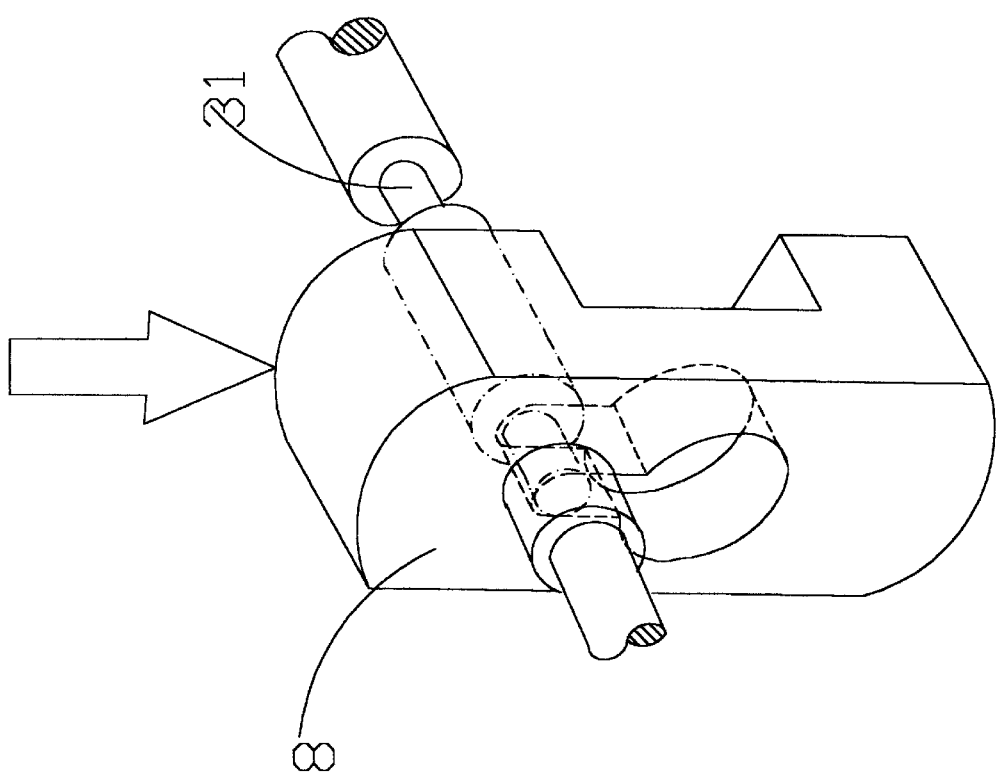
FIG. 6 shows shaft-lock 8 aligned with channel 30 of shaft 4; then pushed upon to insert smaller diameter slot of key-shape opening into channel 30.

Once aligned with channel 31 shaft-lock 8 as shown in FIG. 6 is then pushed in order to insert the smaller diameter slot into the channel to lock shaft 4 in place.

Figure 7:
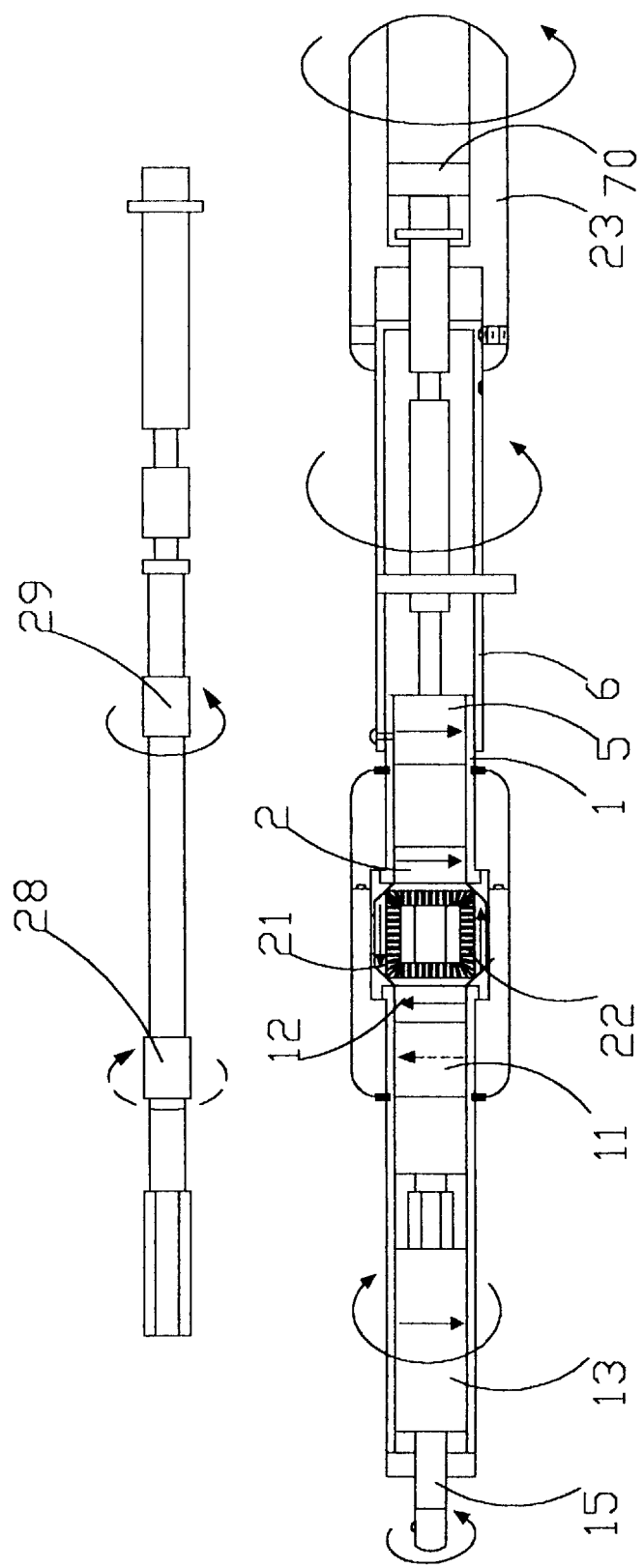
FIG. 7 is a direction-of-rotation-analysis of the components with counter-clockwise rotation applied to the input and producing counter-clockwise output. The device is shown with shaft 4 switched to the position for causing counter-clockwise output.
Figure 8:
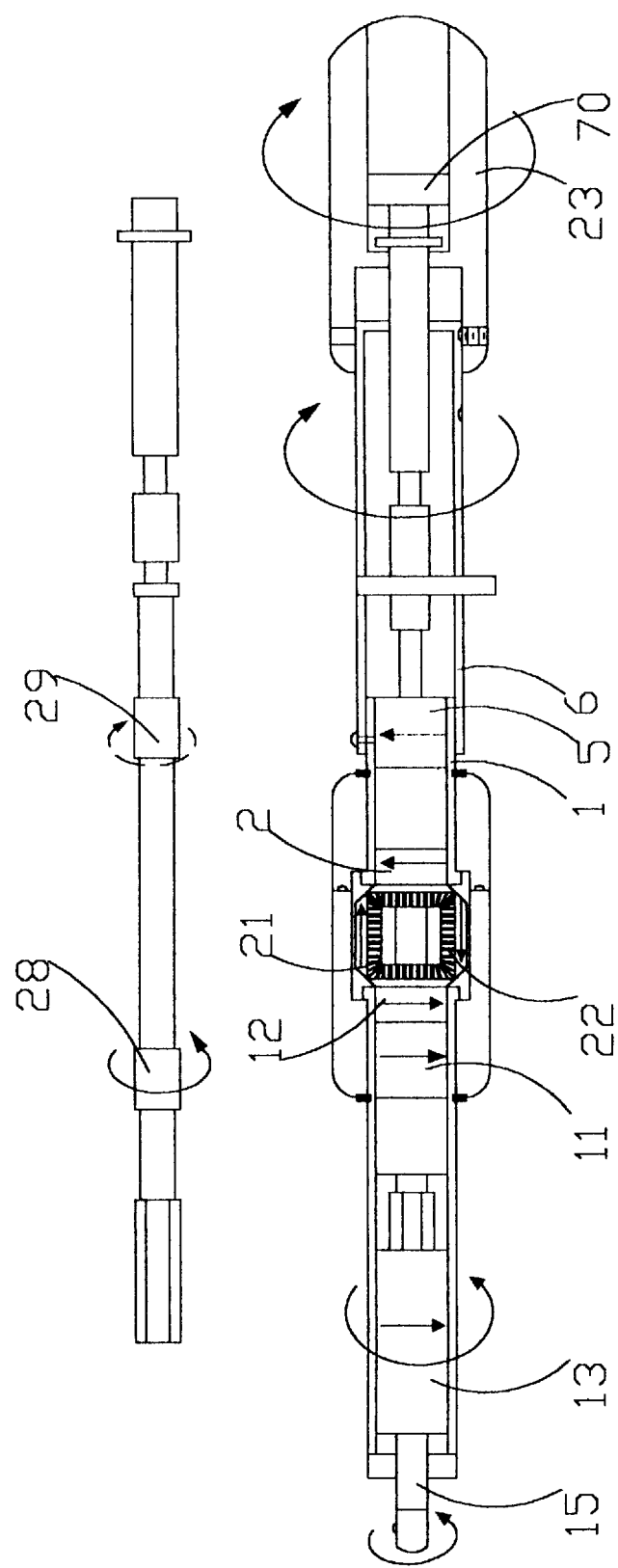
FIG. 8 is a direction-of-rotation-analysis of the components with clockwise rotation applied to the input while still producing counter-clockwise output.

Thus to produce counter-clockwise rotational output from an oscillatory input-motion refer to FIG. 7 and the following direction-of-rotation-analysis of components:
Counter-clockwise rotation is applied to handle 23;
Cylinder 6 is caused to rotate counter-clockwise;
Cylinder 1 assembly is caused to rotate counter-clockwise;
Roller-clutch 5 is caused to rotate counter-clockwise to drive boss 29 counter-clockwise to cause entire shaft 4 to rotate counter-clockwise;
Mitre-gear 2 is caused to rotate counter-clockwise;
Mitre ring-gears 21 and 22 are caused to rotate counter-clockwise;
Mitre-gear 12 is caused to rotate counter-clockwise;
Cylinder 9 assembly is caused to rotate clockwise;
Roller-clutch 11 is caused to rotate clockwise to override boss 28;
Driven-member 13 is caused to rotate counter-clockwise;
Driving-member 15 is caused to rotate counter-clockwise.
Refer to FIG. 8 and the following direction-of-rotation-analysis of components:
Clockwise rotation is now applied to handle 23;
Cylinder 6 is caused to rotate clockwise;
Cylinder 1 assembly is caused to rotate clockwise;
Roller-clutch 5 is caused to rotate clockwise to override boss 29;
Mitre-gear 2 is caused to rotate clockwise;
Mitre ring-gears 21 and 22 are caused to rotate clockwise and thereby converting clockwise rotational input to usable counter-clockwise rotation;
Mitre-gear 12 is caused to rotate counter-clockwise;
Cylinder 9 assembly is caused to rotate counter-clockwise;
Roller-clutch 11 is caused to rotate counter-clockwise to clutch and drive boss 28 counter-clockwise to cause entire shaft 4 to rotate counter-clockwise;
Driven-member 13 is caused to rotate counter-clockwise;
Driving-member 15 is caused to rotate counter-clockwise.

In order for the reversing-input mechanism to operate the gear-housing 17,18 must be held stationary with one hand while the other hand applies oscillatory-motion to handle 23. Without holding the gear box stationary the reversing-input mechanism can not operate and simply rotates along with the tool as oscillatory motion is applied to handle 23. However; without holding thegear-box 17,18 stationary the tool then operates as a "one-way" "quiet" ratchet producing clockwise rotational output and counter-clockwise rotational output. Therefore the applicant's invention is virtually two useful and desireable tools in one embodiment and providing four different functions; a reversing-input mechanism which produces clockwise output, a reversing-input mechanism which produces counter-clockwise output, a quiet-ratchet which produces clockwise output and a quiet-ratchet which produces counter-clockwise output.

Figure 9:
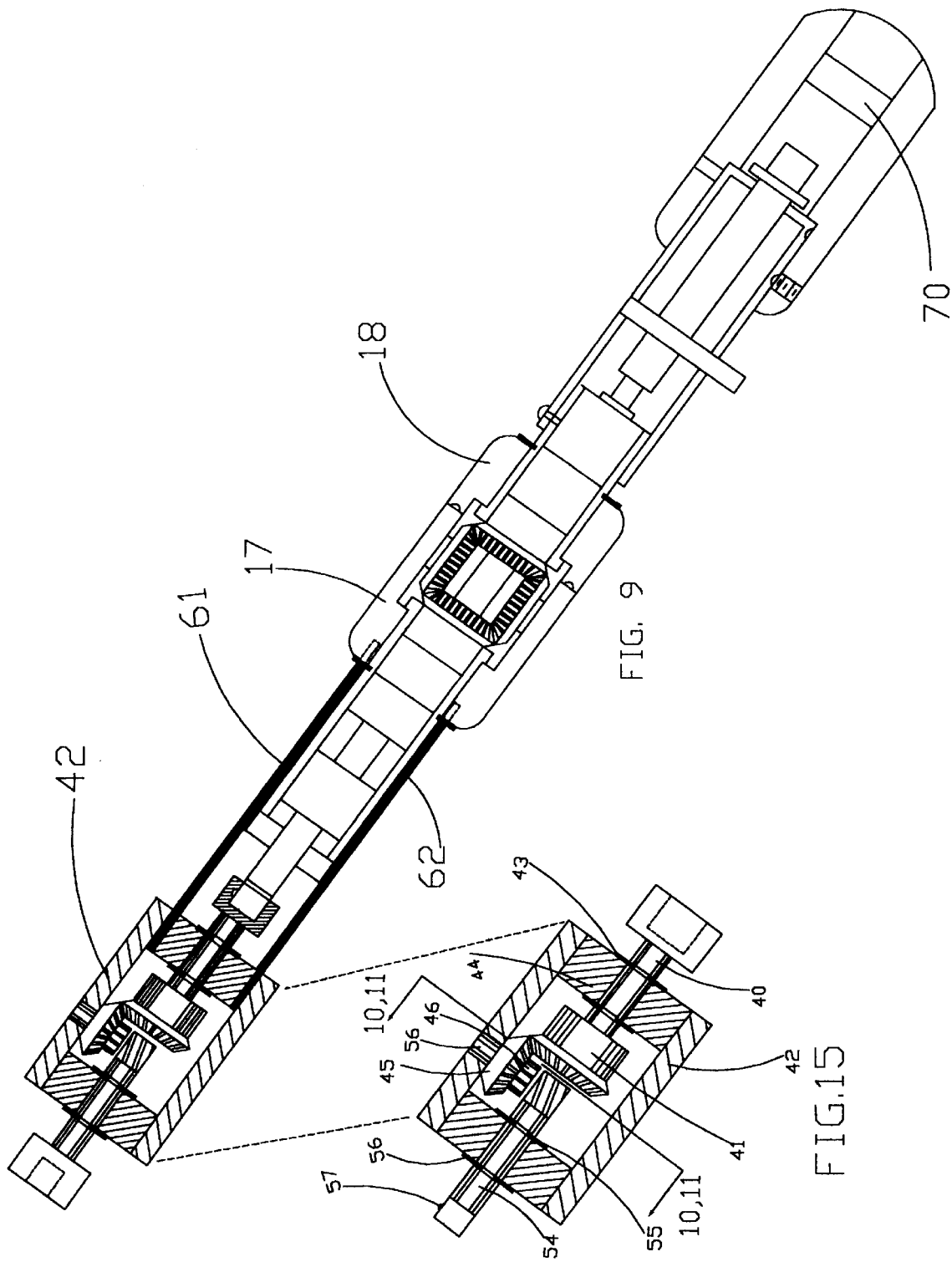
FIG. 9 shows the anti-rotation attachment with rods 61,62 which anchor gear-box to the anti-rotation-attachment.

For situations requiring one hand to hold the workpiece and not the gear-box and still be able to activate the reversing-input mechanism while applying oscillatory-motion to handle 23 with the other hand,an anti-rotation-attachment of FIG. 9 is provided to hold the gear-box stationary thereby enabling the use of the reversing-input mechanism.

Square-ended driving-member 15 provided with ball-plunger 16 is inserted into square opening in the end of input-shaft 40. Bevel-gear 41 is pressed onto the opposite end of input-shaft 40 which is rotatably supported in bore provided in housing 42 and retained in place with retaining-rings 43 and 44.

Figure 10:
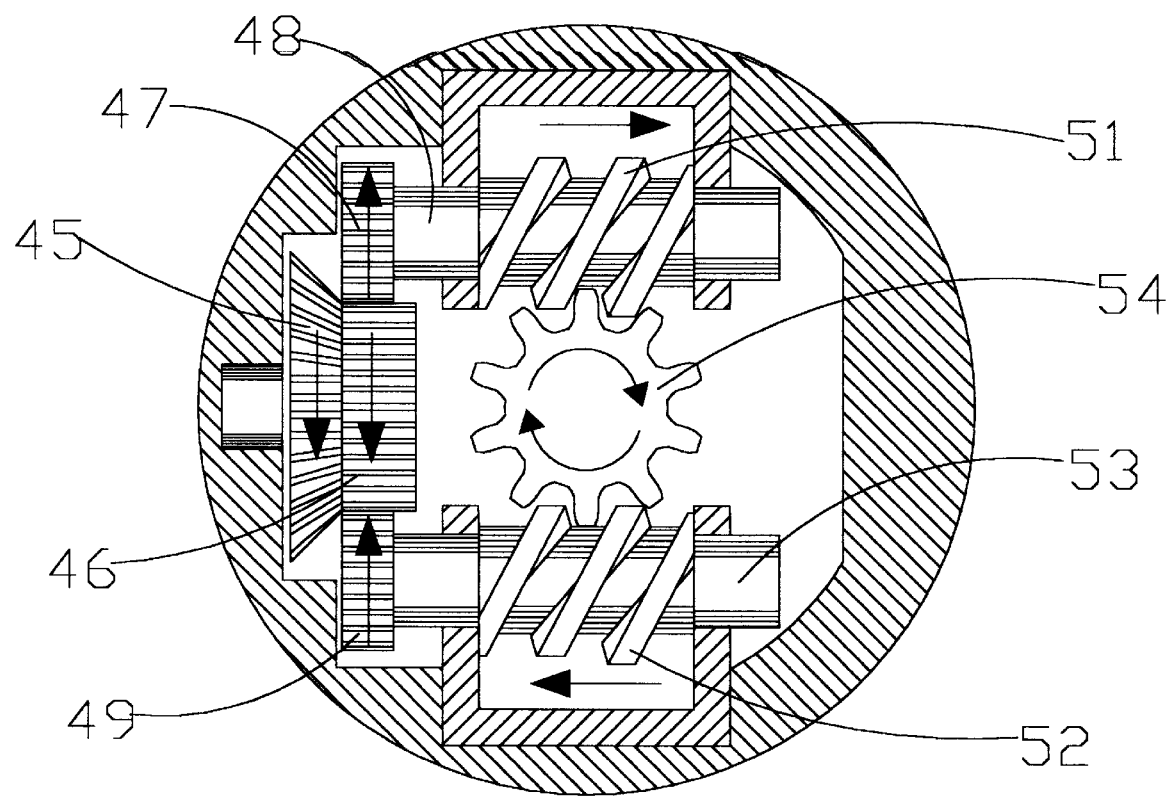
FIG. 10 is a direction-of rotation analysis of components of the anti-rotation attachment producing clockwise output.
Figure 11:
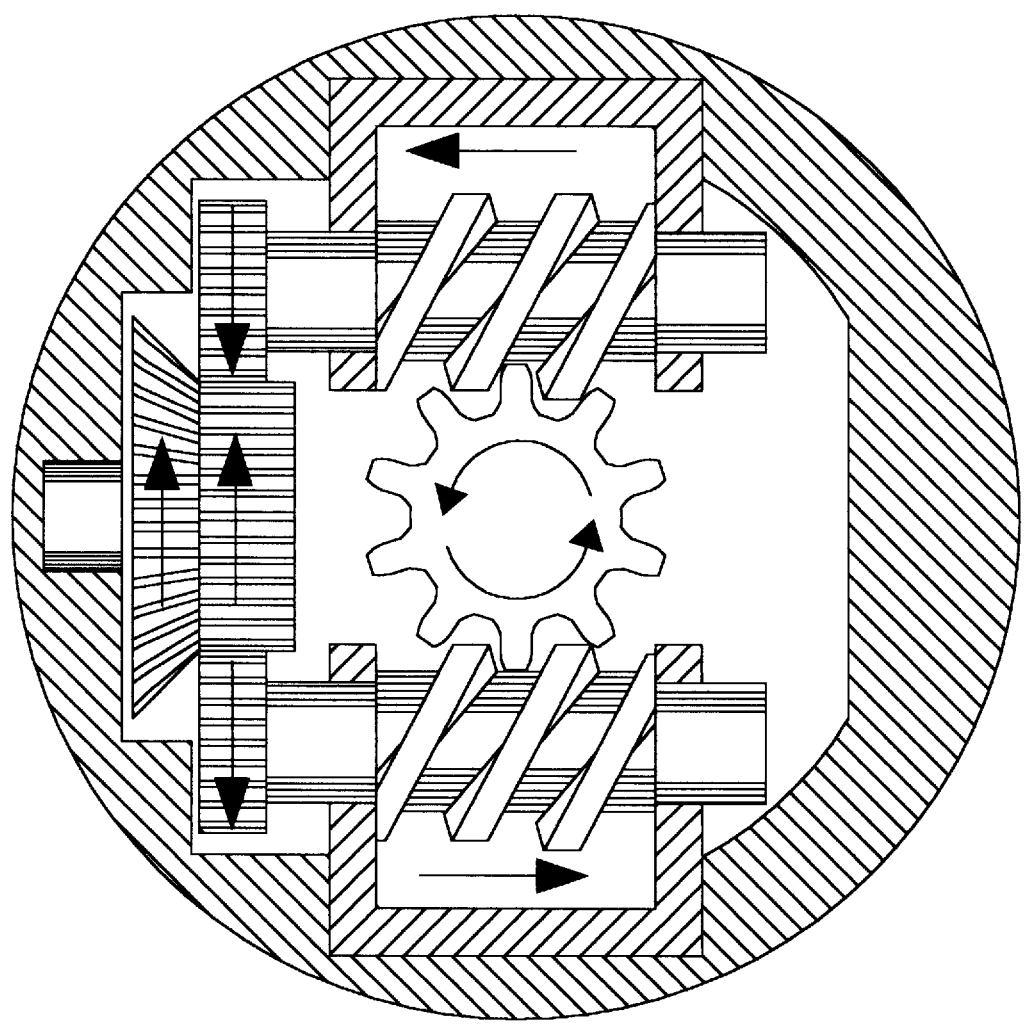
FIG. 11 a direction of rotation analysis of components of the anti rotation attachment producing counter clockwise output.

Compound-gear 45,46 rotatably mounted onto shaft 56 which is pressed into side wall of housing 42 and disposed perpendicular to input shaft 40 and output shaft 54, consists of bevel-gear 45 which is directly driven by bevel-gear 41 while spur gear 46 simultaneously drives spur-gear 47 pressed onto shaft 48 and spur-gear 49 pressed onto shaft 53. Worm-gear 51, also fixedly mounted onto shaft 48 FIG. 10 is driven by spur-gear 47 while worm-gear 52 fixedly mounted onto shaft 53 is driven by spur-gear 49. Output shaft 54 having a spiral tooth section at its end,which is internal of housing 42, for being being driven clockwise and counter-clockwise by worm-gears 51 and 52 is rotatably supported in bore provided at the output end of housing 42 and retained in place with retaining-rings 55 and 56. Ball-plunger 57 is installed in the square external end of output shaft 54 for receiving standard driving attachments such as screw driver tips, sockets, nut drivers and hex driver tips.

Through the use of a pair of worm-gears having a high reduction ratio and their axis transverse to the output drive axis an internal braking-force is created to constrain rotation of anti-rotation attachment. Due to its built-in internal resistance-to-rotation the attachment provides a stationary member to which the gear-box can be anchored and thereby not being required to be held stationary by hand. In FIG. 9, to prevent gear-box rotation without holding it stationary by hand, rods 61 and 62 are provided to anchor gear-box to the anti-rotation-attachment.

Figure 12A:
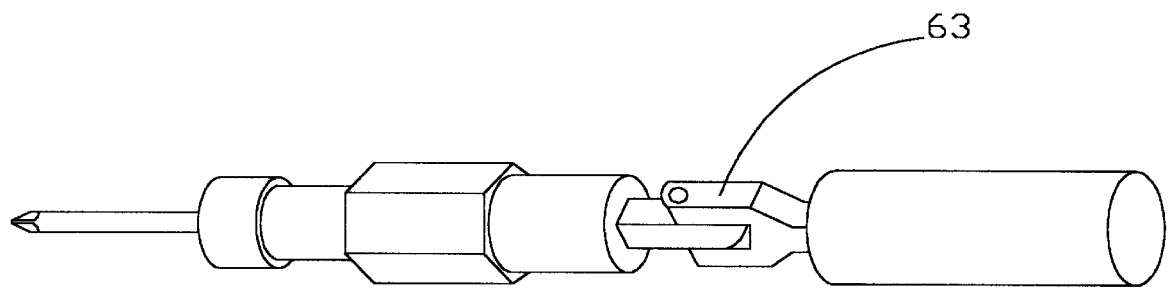
FIG. 12A shows the use of a hinged handle attachment serving as an extension.
Figure 12B:
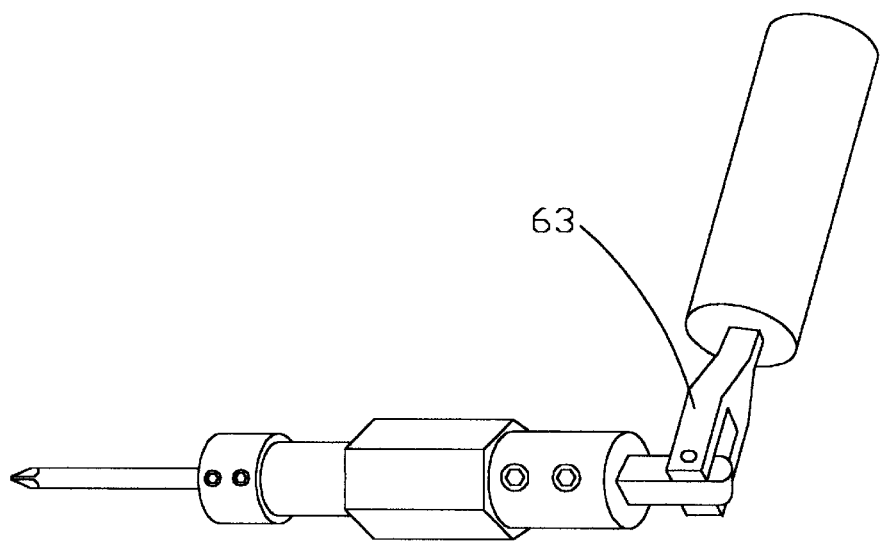
FIG. 12B shows the use of hinged handle attachment disposed at 90° to serve as a lever to apply either a finishing torque during the fastening of hardware or a breaking torque during the unfastening of hardware.

Standard hinged-handle 63 of FIG. 12 having a square-end with ball-plunger for retaining attachments is inserted into square opening of handle 23 and is provided as an accessory for axial-driving of hardware while using the reversing-input mechanism then is caused to pivot perpendicularly to the drive axis to provide the mechanical advantage of a radial-arm to apply a finishing-torque to fasten hardware.

Hinged-handle 63 also provides the same mechanical advantage of the radial-arm to break the threshold-torque to unfasten hardware then is caused to pivot to axial-position while employing the reversing-input mechanism to remove the hardware.

The procedure for sliding drive-shaft 4 longitudinally from one pair of roller-clutches to the other pair of roller-clutches to switch to either clockwise or counter-clockwise rotational output is previously described as requiring a three-step motion: lift the shaft-lock, slide the shaft longitudinally then push onto the shaft-lock to lock shaft in position. Numerous other mechanisms requiring only one-step motion can be employed to cause the drive-shaft to slide longitudinally from one pair of roller-clutches to the other pair of roller-clutches.

Figure 13:
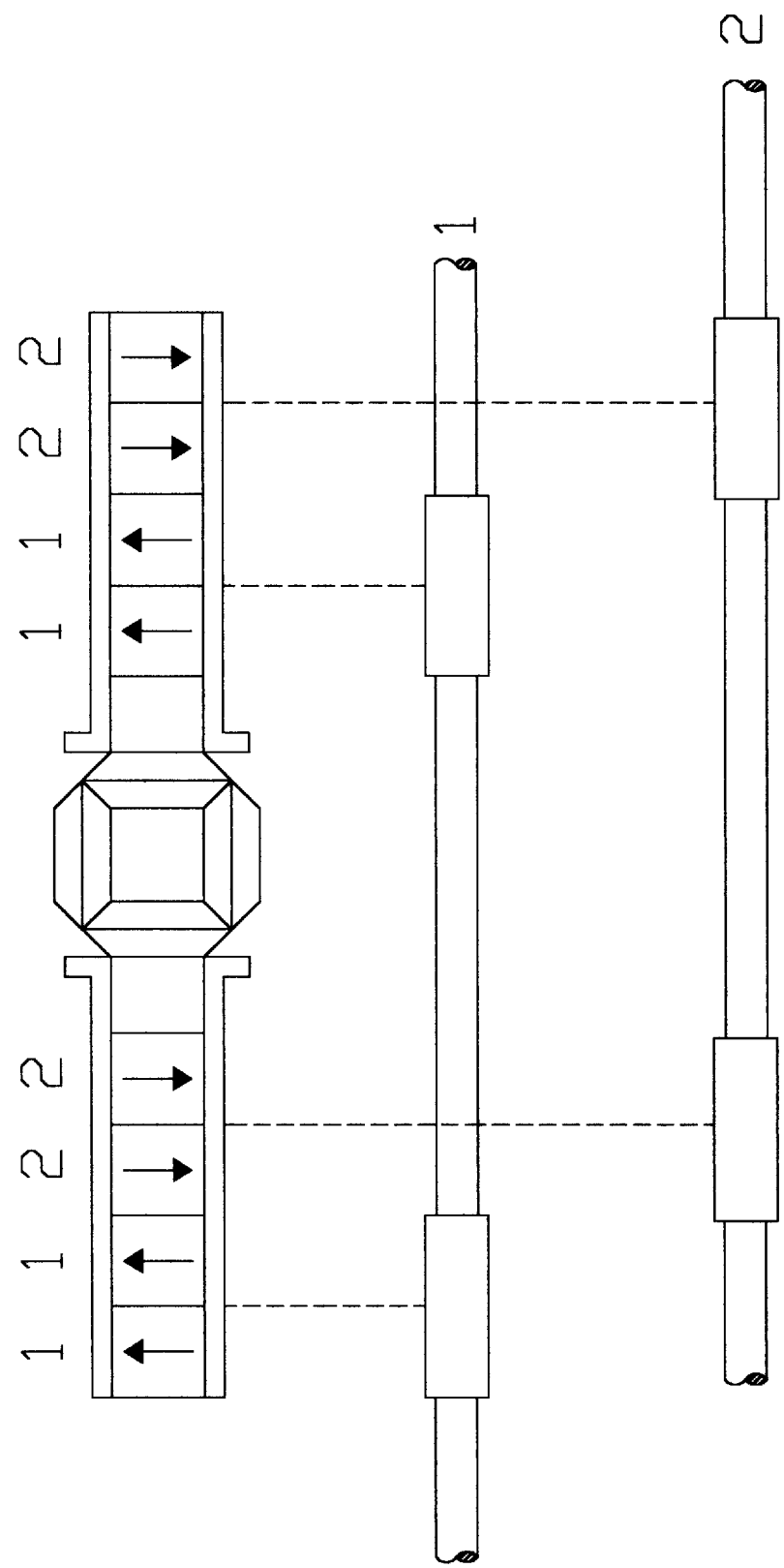
FIG. 13 shows another configuration of components with concentric and in line bores, but with a "doubling up" of roller clutches to increase the torque capacity by 100% for input and output.
Figure 14:
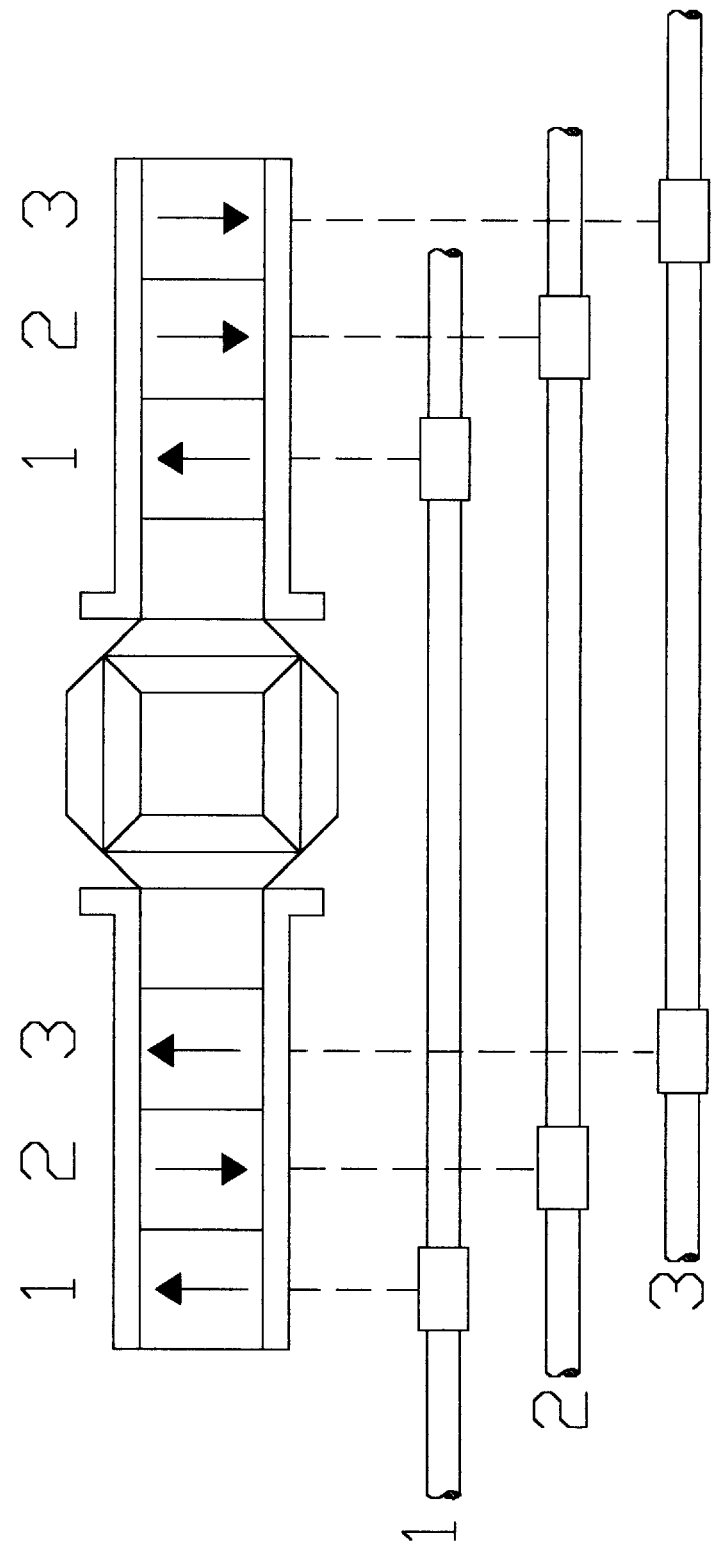
FIG. 14 shows another arrangement of the roller clutches whereby: the first pair is identically disposed to alternately clutch and drive the shaft only in clockwise rotation; the second pair is indentically disposed to clutch and drive the shaft only in counter clockwise rotation; the third pair is oppositely disposed whereby the shaft can not be driven by any of the roller clutches, neither clockwise nor counter clockwise; shaft is locked into a non rotatable position thereby providing the option of being able to be driven directly as is a standard screw driver.

It must be realized that the reversing-input mechanism including the alternate arrangements shown in FIG. 13 and FIG. 14 with the bores of all components being concentric and disposed into an in-line configuration can be switched to either clockwise or counter-clockwise output by "inverting" the mechanism 180 degrees. But, by providing a shaft which can be caused to quickly and conveniently slide longitudinally from one pair of identically-disposed pair of roller-clutches to an oppositely identically-disposed pair of roller-clutches to achieve clockwise and counter-clockwise output respectively, eliminates the need to inconveniently "invert" the mechanism.

Handle (23) of FIG. 1 has a larger bore at its anterior end for sliding onto the free end of cylinder 6. An open ended slot at the anterior end of cylinder 6 aligns with and captures post 24 which is pressed perpendicularly into top side of cylinder 6 for driving cylinder 6 in clockwise and counter-clockwise rotation. Smaller bore at the posterior end of handle 23 is for shaft 4 to be fully inserted into tool until the hex section at front end of shaft 4 is fully inserted into the hex-shape bore of driven-member 13 and the back end of shaft 4 is rotatably supported by smallest bore of handle 23. Flanged cap-head screw 25 is screwed into threaded bore of posterior end of shaft. Shoulder of smallest bore of handle 23 contacts the flange of cap-head screw as handle 23 is pulled-on to draw shaft toward the posterior end of tool and thereby sliding shaft longitudinally from one pair of roller-clutches to the other pair for switching to either clockwise or counter-clockwise output. Cap 70 screwed into the posterior bore of handle 23 serves as the bearing surface which pushes against cap-head screw 25 as handle is pushed-on to longitudinally slide bosses 28 and 29 of shaft 4 into engagement with first pair of roller-clutches when clockwise output is required.

While the above description contains many specificities, these must not be construed as limitations on the scope of the invention, but rather as an exemplification of a general configuration thereof. Numerous other arrangements of mechanical components are possible for producing a clockwise output from an oscillatory input and for producing a counter-clockwise output from an oscillatory input within the same embodiment.

I claim:

1. A reversing-input, bidirectional-output drive mechanism for converting oscillatory-rotation applied to input into clockwise rotational-output and for converting oscillatory-rotation applied to input into counter clockwise rotational-output comprising:

a single one-piece drive shaft serving as an Input member and an output member with the capability of being caused to slide longitudinally to switch the entire mechanism to either clockwise or counter clockwise output mode, a first flanged-end hollow cylinder with a hub of a first mitre gear pressed into its flanged-end with a first cylindrical one-way roller-clutch disposed so as to clutch and cause the drive-shaft to rotate only in clockwise rotation pressed into a bore of a flangeless-end of the hollow cylinder and against the hub of the first mitre gear and with a second cylindrical one-way roller-clutch disposed so as to cause the drive-shaft to rotate in only counter clockwise rotation, pressed into its flangeless-end and against the first roller-clutch, a second flanged-end hollow cylinder having a third one-way roller-clutch disposed so as to clutch and cause the drive-shaft to rotate only in clockwise rotation, pressed into a bore of its flanged-end and against a shoulder of a smaller bore; a fourth one-way roller-clutch disposed so as to clutch and be caused to drive the drive-shaft only in counter clockwise rotation, pressed into its flanged-end and against the third roller-clutch while the hub of a second mitre gear is pressed completely into the bore of the flanged-end of the second flanged-end hollow cylinder and with a hollow driven-member having a hex-shape through-bore for accepting a hex-shape front end of the drive-shaft into its posterior end, being rotatably retained into a bore of a flangeless-end of the second flanged-end hollow cylinder between a second shoulder of the smaller bore and a threaded-end of a cap which screws into a threaded bore of the second flanged-end hollow cylinder and is provided with a driving member which passes into the hex-shape through-bore to receive and retain standard attachments with a spring-loaded ball-plunger installed at its end, a hollow flangeless cylinder with its open-end slid onto and secured to the flangeless-end of the first flanged-end hollow cylinder with a fastener and provided with a through-bore at its diameter into which a cylindrical shaft lock is inserted, slideably retained and provided at its middle with a key-hole shaped opening consisting of a larger diameter opening through which a largest diameter of the drive-shaft passes longitudinally and a smaller closed and round end-slot for being inserted into a smaller diameter channels provided in the drive-shaft for locking the drive-shaft in place by preventing its longitudinal movement while a back end of the hollow flangeless cylinder has an opening through which the drive-shaft passes longitudinally and with which the hollow flangeless cylinder rotatably supports the drive-shaft during its rotations, a cylindrical handle with a larger-bore posterior end slid onto a free end of the hollow flangeless cylinder and provided with an open-end slot at its posterior end for aligning with and capturing a post which is pressed into an opening provided in the top side of the hollow flangeless cylinder for driving the hollow flangeless cylinder in clockwise and counter clockwise rotation while a second spring-loaded ball-plunger is installed into the side of and perpendicular to the cylindrical handle for locating and locking Into detents provided in the outside surface of the hollow flangeless cylinder thereby aligning a first channel with the shaft lock and maintaining a first boss and a second boss in engagement with the first roller-clutch while the shaft lock is caused to be inserted into the first channel to lock the drive shaft in place and to align a second channel with the shaft-lock and maintain the first boss and the second boss in engagement with the second roller-clutch and the fourth roller-clutch while the shaft-lock is caused to be inserted into the second channel to lock the drive-shaft in place while a smaller bore at the posterior end of the cylindrical handle is for the drive-shaft to be fully inserted into a hex-shape bore of a driven-member and the back end of the drive-shaft is rotatably supported by the smaller bore of the cylindrical handle with a flanged cap-head screw screwed into a threaded bore of the posterior-end of the drive-shaft while a shoulder of the smaller bore of the cylindrical handle is pulled-on to draw the drive-shaft toward the posterior-end of the tool and thereby sliding the drive-shaft longitudinally to slide the first and second bosses from one pair of the roller-clutches to the other pair for switching to either clockwise or counter clockwise output with a cap screwed into the posterior bore of the cylindrical handle and serving as a bearing surface which pushes against the cap-head screw as the cylindrical handle is pushed-on to longitudinally slide the first and second bosses into engagement with the first pair of roller-clutches when clockwise output is required, a gear housing comprising of an open-ended container-like front-section whose length extends beyond a first post and a second post which are pressed into openings provided for rotatably mounting a first mitre ring-gear and an oppositely-facing second mitre ring-gear which are disposed perpendicular to and meshing simultaneously with the first mitre-gear and second mitre-gear whereby a front end of the front-section has an opening provided into which the second flanged-end cylinder is inserted with its flange on the outside of the container and with a first retaining ring installed into a groove in the second flanged-end cylinder at the immediate outside surface of the front-section to retain the second flanged-end cylinder assembly rotatably in place while a plurality of rounded-tip dowels are pressed into bores provided in a rim of the open-end of the front-section for aligning with and mating with bores provided in a rim of an open-ended container-like back-section, the gear housing further comprising the open-ended container-like back-section with an opening provided at the back end into which the first flanged-end cylinder is inserted with its flange on the Inside of the container-like back-section and with a first retaining ring installed into a groove of the first flanged-end hollow cylinder at the immediate outside surface of the back-section to retain the first flanged-end hollow cylinder rotatably in place while the plurality of bores in the rim of the open end of the back-section are provided for aligning with and mating, with a snug slip-fit, with the plurality of dowels in the rim of the front-section.

2. The reversing-input, bidirectional-output drive mechanism of claim 1 for converting oscillatory-rotation applied to input into clockwise rotational-output and for converting oscillatory-rotation applied to input into counter clockwise-rotational output whereby the single one-piece drive-shaft, which serves as the input and the output member, comprises the hexagonal section at the front end of the drive-shaft which is permanently and slideably engaged with the driven member to drive it in clockwise or counter clockwise rotation while the first boss and the second boss, disposed at the mid section of the drive-shaft and initially clutched and driven alternatingly in clockwise rotation by the first and third one-way roller-clutches, are caused to slide out of engagement from the first and third one-way roller-clutches and into engagement with the second and fourth one-way roller-clutches in order to be clutched and driven in counter clockwise rotation while the first channel and the second channel, disposed at the posterior section of the drive-shaft, are locking features for the shaft-lock to be inserted into to prevent the drive-shaft from sliding longitudinally while the first and second bosses are engaged with and driven by either the first and third roller clutches which cause clockwise rotation or the second and fourth roller clutches which cause counter clockwise rotation.

3. The reversing-input, bidirectional-output drive mechanism of claim 1 for converting oscillatory-rotation applied to input into clockwise rotational-output and for converting oscillatory-rotation applied to input into counter clockwise rotational-output, further comprising:

an anti-rotation attachment provided with an internal braking force to constrain rotation of the anti-rotation attachment and thereby provide a stationary member to which the near housing of the drive mechanism can be anchored to eliminate the need to hold the drive mechanism gear housing stationary by hand.

4. The reversing-input, bidirectional-output drive mechanism of claim 3 for converting oscillatory-rotation applied to input into clockwise rotational-output and for converting oscillatory-rotation applied to input into counter clockwise rotational-output whereby the anti-rotation attachment comprises:

a first bevel gear pressed onto an end of an input shaft which is rotatably supported in a bore provided in a housing and retained in place with a first retaining ring installed in a groove provided in the input shaft external of the housing and a second retaining ring installed into a groove provided in the input shaft internal of the housing, a compound gear rotatably mounted onto a first shaft which is pressed into a side wall of the housing and disposed perpendicular to the input shaft and an output shaft, is composed of a second bevel gear which is directly driven by the first bevel gear and a first spur gear which simultaneously drives a second spur gear fixedly mounted onto a second shaft and a third spur gear fixedly mounted onto a third shaft, a first worm gear fixedly mounted onto the second shaft and driven by the second spur gear and a second worm gear fixedly mounted onto the third shaft and driven by the third gear, the output shaft having a spiral-tooth section at an end is internal of housing for being driven clockwise or counter clockwise by the first and second worm gears and transversely disposed to the output axis, is rotatably supported in a bore provided at the output end of the housing and retained in place by a third retaining ring installed into a groove provided in the output shaft internal of the housing and by a fourth retaining ring installed into a groove provided in the output shaft external of the housing, a spring-loaded ball plunger installed into a square external end of the output shaft for receiving and retaining standard driving attachments.

5. The reversing-input, bidirectional-output drive mechanism of claim 3 for converting oscillatory-rotation applied to input into clockwise rotational-output and for converting oscillatory rotation of input to counter clockwise rotational-output whereby without activating the reversing-input mechanism, by not manually holding the gear housing stationary nor using the anti-rotation attachment, the mechanism can be simply operated as a direct-drive for clockwise output or a direct-drive for counter clockwise output.

\* \* \* \* \*